United States Patent [19]

von Estorff et al.

[11] Patent Number: 4,730,815
[45] Date of Patent: Mar. 15, 1988

[54] LEAF-SPRING

[75] Inventors: Eckart von Estorff, Hagen; Josef Wienand, Werdohl, both of Fed. Rep. of Germany

[73] Assignee: Krupp Büninghaus GmbH, Werdohl, Fed. Rep. of Germany

[21] Appl. No.: 880,173

[22] Filed: Jun. 30, 1986

[30] Foreign Application Priority Data

Jul. 5, 1985 [DE] Fed. Rep. of Germany ....... 3524077

[51] Int. Cl.4 .......................... F16F 1/18; F16F 1/36
[52] U.S. Cl. ...................................... 267/52; 267/148
[58] Field of Search ................ 267/36 R, 47, 52, 148,
267/149, 30, 40, 53, 19 R, 48; 280/669, 699, 718; 264/258, 261, 275

[56] References Cited

U.S. PATENT DOCUMENTS

| 1,097,386 | 5/1914 | Boreham | 267/53 |
| 1,925,253 | 9/1933 | James | 267/47 X |
| 3,231,258 | 1/1966 | Brownyer et al. | 267/47 X |
| 4,598,900 | 7/1986 | Yamamoto et al. | 267/52 |

FOREIGN PATENT DOCUMENTS

84/01413 4/1984 World Int. Prop. O. ............ 267/47

Primary Examiner—Andres Kashnikow
Assistant Examiner—Robert J. Oberleitner
Attorney, Agent, or Firm—Erwin S. Teltscher

[57] ABSTRACT

A leaf spring to be clamped between a saddle of the vehicle axle and a clamping plate by means of two connecting elements spaced from one another in a longitudinal direction has an elongated spring member extending in the longitudinal direction, and is composed of a fiber-reinforced duro-plastic synthetic material. At least two supporting plates each have a length exceeding the length of the saddle or of the clamping plate, and each have an inner region located inside the connecting elements, and an outer region located outside the connecting elements. One of the supporting plates is located at one side of the spring member, so as to be arranged between the spring member and the saddle, the other of the supporting plates is located at the other side of the spring member so as to be located between the spring member and the clamping plate. The supporting members abut against the spring member in the inner region, and pressure cushions composed of a rubber-elastic material are each located between a respective one of the supporting plates and the spring member in the outer region.

27 Claims, 2 Drawing Figures

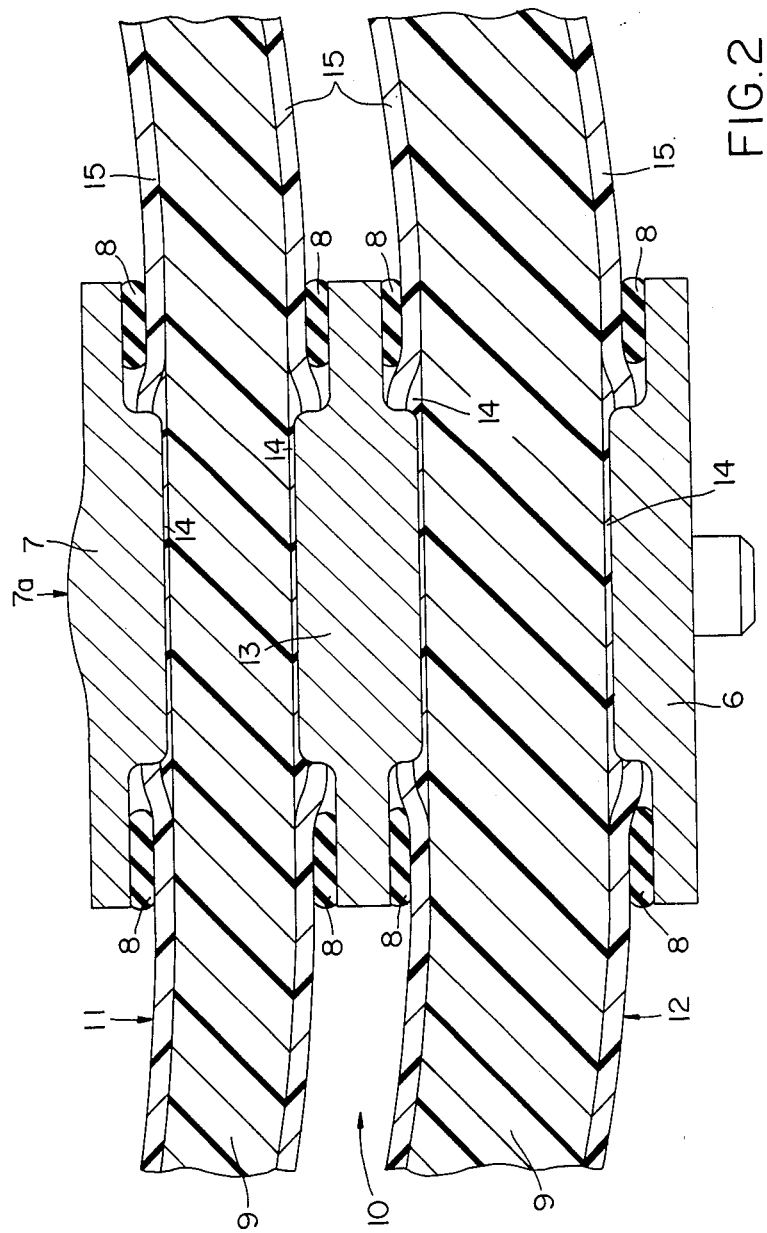

LEAF-SPRING

BACKGROUND OF THE INVENTION

The present invention relates to a leaf-spring. More particularly, it relates to a leaf-spring which is composed of a fiber-reinforced duroplastic synthetic material, and which is clamped to a saddle of a vehicle axle by means of briden-type connecting elements (screws or brackets) and a clamping plate. In such springs there is a danger that the high pressure in the region of the axle clamping leads after a certain time to settling of the spring set, and thereby to loosening of the connecting elements. Moreover, the surfaces of the spring leaves can be damaged on the clamping edges in vehicle travel when the leaf-spring is subjected to alternating stresses, and during vehicle starting and braking, as a result of small relative movements between the spring leaves and the surfaces of the clamping elements, as well as during the movements of the spring leaves relative to one another.

SUMMARY OF THE INVENTION

Accordingly, it is an object of the invention to provide a leaf-spring which avoids the disadvantages of the prior art.

More particularly, it is an object of the present invention to provide a leaf-spring which makes possible transmission of the static and dynamic spring forces and moments from the axle to the spring leaf or spring leaves, without causing settling or damage to the spring set in the region of the axle clamping. In this manner loosening of the connecting elements, displacement of the spring leaves on the axle saddle and destruction of the spring are avoided.

In keeping with these objects and with others which will become apparent hereinafter, one feature of the present invention resides, briefly stated, in that the supporting plates are provided between the axle saddle and the leaf spring, between the clamping plate and the leaf-spring, and between the individual leaves of the leaf spring. The length of the supporting plates is greater than the length of the axle saddle and the clamping plate; also the supporting plates lie in the inner region between the connecting elements, and directly on the fiber-reinforced duroplastic synthetic material of the spring leaf, while in the outer region outside the connecting elements they are connected with the surfaces of the spring leaves through pressure cushions of a rubber-elastic material.

Due to the supporting plates being positioned in the entire region between the connecting elements and directly on the fiber-reinforced duroplastic synthetic material,- which is very pressure-resistant, particularly in the presence of a certain proportion of fibers extending transverse to the longitudinal direction of the spring, - the available pressure surface is used for clamping of the axle in an optimal manner, so that a minimal relaxation of the synthetic plastic spring in the region of its clamping with the vehicle axle is to be expected. The extension of the supporting plates beyond the region of the axle clamping provides a greater basis for pairs of forces resulting from starting and braking moments, and thereby a reduction of the forces which additionally act upon the spring surfaces at the clamping edges.

The interposition of the rubber-pressure cushion additionally prevents damage to the surfaces of leaves at the clamping edges, because of the relative movements between the spring leaves and the supporting plates in the longitudinal direction of the spring, when it is subjected to alternating stresses. Moreover, due to the extended region of the axle clamping, the rubber pressure cushions uniformly distribute the forces, which arise at the clamping edges, over the surfaces of the leaves. Hence the movability of the leaves during a spring movement or spring stroke is not unnecessarily impaired.

The supporting plate located between the clamping plate and the leaf spring is advantageously convex at its side facing the clamping plate in the region between the connecting elements. It it is formed here with a slight curvature toward the clamping plate, so that during tightening of the connecting screws it acts more strongly upon the central part of the clamping region. Thereby, the pressure loading of the synthetic plastic spring is distributed in the region of the axle clamping uniformly over the entire pressing surface and reduced to an absolute minimum. In particular, the pressure peaks are reduced in the region under the connecting elements. Thereby settling in the synthetic plastic material is avoided, which otherwise can lead to a loosening of the clamping with the axle saddle and as a result to a displacement of the spring relative to the axle.

The supporting plates can be composed, for example, of metal or a fiber-reinforced duroplastic synthetic material. In the clamping region inside the connecting elements the supporting plates are advantageously firmly and adhesively connected to the fiber-reinforced synthetic plastic of the spring leaves. Such adherence of the supporting plates to the spring leaves with the aid of glueing ensures, first of all, that the spring set is assembled as a spatial unit and individual parts are fixed relative to one another.

Preferably the upper pressure cushions outside the connecting elements are firmly and adhesively connected to the supporting plates and to the surfaces of the spring leaves by vulcanization or glueing. This also contributes to the firm assembly of the spring set. It is, however, even more noteworthy that as a result of these features, the pressure resistance of the rubber cushion, and thereby its effectiveness for absorbing forces caused by starting and braking moments is increased. Otherwise the pressure forces would, after a certain time, result in the rubber creeping out from the region of the supporting plates.

Preferably the pressure cushions arranged between the supporting plates and the surfaces of the spring leaves are pre-tensioned. The pre tensioning of the rubber pressure cushions increases their efficiency in taking up of forces caused by starting and braking moments. It unloads and simultaneously protects the fiber-reinforced synthetic plastic material from damage in the regions under the connecting elements.

The fiber-reinforced duroplastic synthetic material of the spring leaves is formed preferably as a bearing laminate which absorbs static and dynamic spring forces and moments. Non-bearing protective layers are arranged on the upper and lower side of the bearing laminate of the spring leaves, preferably in the region of clamping with the axle saddle. The protective layers can also be composed of a fiber-reinforced duroplastic synthetic material. The covering of the bearing laminates, —which are substantially longitudinally oriented laminates of the spring leaves, —by non-bearing protective layers of the fiber-reinforced synthetic plastic material in the region of the axle clamping is required under certain circumstances. It is required, first of all, when due to manufacturing, optical and durability grounds thermoplastic cover layers normally available for increasing the pressure strength of the spring set in the region inside the connecting elements are to be removed. Such removal can take place, for example by milling, without at the same time damaging the bearing laminate. The protective layers can be reinforced for obtaining the significant pressure strength, for example by an arrangement of short fibers, or by arranging long fibers to cross transversely at a 45° angle relative to the longitudinal direction of the spring.

Moreover, the pressure forces of the briden clamping with the connecting elements are uniformly distributed by means of the interposition of the protective layers of fiber compound material, which does not contribute to the spring action. Consequently these forces are uniformly distributed, and therefore transmitted to the bearing laminate in a more protective manner. This effect can be further intensified by complete or partial filling of the milled-out layers with non-bearing fiber-reinforced synthetic plastic material. This makes it possible to avoid even the smallest longitudinal displacements between the supporting plates and the bearing laminate, —which normally take place also in the event of firm clamping of the spring set with the axle saddle at the edge of the direct clamping region under the connecting elements, —when the spring set is subjected to alternating stress. Such displacements can otherwise destroy the high loaded edge fibers of the bearing laminate.

For manufacture of the inventive leaf spring, it is preferable first to remove completely the through-going thermoplastic cover layers, and to remove partially the fiber-reinforced duroplastic protective layers by milling in the clamping region inside the connecting elements on the upper and lower sides of the spring leaves, and optionally to again reinforce the protective layers by glueing of fiber compound material. The spring leaves are then connected by glueing to the supporting plates, the latter having been provided with pressure cushions of the rubber-elastic material, which have already been vulcanized or glued onto the supporting plates.

By the milling-out of the thermoplastic cover layer, and of a part of the fiber-reinforced duroplastic protective layer over a length which corresponds to the part of the respective supporting plate facing the spring leaf, the additional advantage is obtained in that a certain form-locking effect is attained between the spring leaves and the clamping parts. This is advantageous for centering and fixation of the spring set on the axle saddle.

The bearing laminate does not have to be drilled, which is advantageous for the long service life of the leaf spring of the fiber-reinforced synthetic plastic material.

The novel features of the present invention are set forth in particular in the appended claims. The invention itself, however, as to its construction and method of manufacture will be best understood from the following description of preferred embodiments, which is accompanied by the following drawings.

BRIEF DESCRIPTION OF THE DRAWINGS

FIG. 2 is a longitudinal section of the region of axle clamping of a double leaf spring of a fiber-reinforced synthetic plastic material in accordance with the present invention, wherein the spring set includes a main spring leaf and an additional leaf spring.

DESCRIPTION OF PREFERRED EMBODIMENTS

Figure 1:
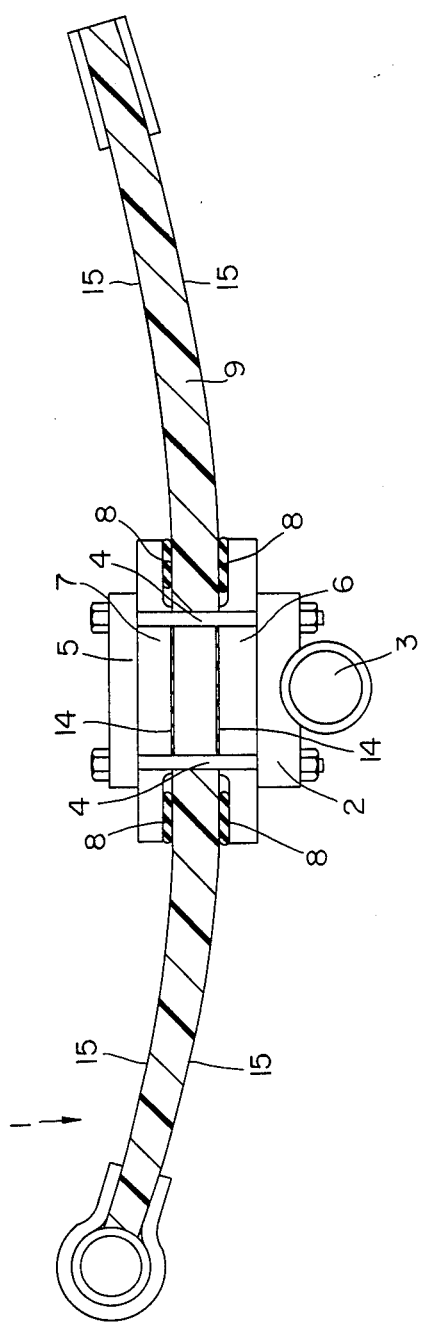
FIG. 1 is a side view of a single leaf spring of the fiber-reinforced synthetic plastic material, which provides a connection with a vehicle axle, in accordance with the present invention.

A single leaf spring 1 shown in FIG. 1 is arranged on a vehicle axle 3 by means of an axle saddle 2. Briden-like connecting elements 4 in the form of screws are used for mounting the single leaf spring 1 on the axle saddle 2. The connecting elements 4 extend through aligned openings of the axle saddle 2 and a clamping plate 5 arranged above it, and they are fixed by nuts threaded on the screws. A lower supporting plate 6 lies on the axle saddle 2, and is arranged between the axle saddle 2 and the single leaf spring 1. An upper supporting plate 7 lies on the single leaf spring 1, and is arranged between the single leaf spring 1, and the clamping plate 5.

The supporting plates 6 and 7 are longer than the axle saddle 2 and clamping plate 5 in the longitudinal direction of the spring. In the region inside the connecting elements 4, they abut directly against the fiber-reinforced synthetic plastic material of the single leaf spring 1. The supporting plates 6 and 7 can be composed for example of metal or fiber-reinforced duroplastic synthetic material. The supporting plates 6 and 7 are thinner in the region located outside the connecting elements 4 than in the region located inside the connecting elements 4. A pressure cushion 8 is located between each thinner part of each supporting plate 6 and 7, on the one hand, and the lower or upper surface of the single leaf spring 1, respectively, on the other hand. The pressure cushion 8 is composed of a rubber-elastic material which can be pre-tensioned.

The single leaf spring 1 is composed essentially of a bearing laminate 9 of fiber-reinforced duroplastic synthetic material, which absorbs the static and dynamic spring forces and moments. A non-bearing protective layer 14 is arranged on the upper side and the lower side of the bearing laminate 9 within the pre-tensioned region of the axle saddle 2. The protective layer 14 is also composed of fiber-reinforced duroplastic synthetic material. The fiber-reinforced duroplastic synthetic material of the laminate 9 is covered outside the connecting elemnts 4 with an upper and a lower non-bearing cover layer 15 of a soft thermoplastic synthetic material.

The leaf spring 1 shown in FIG. 2 of the drawing is formed as a double leaf spring 10 with a main spring leaf 11 and an additional spring leaf 12 arranged under the main spring leaf 11. Each spring leaf includes a bearing laminate 9 and the protective layers 14 above the laminate and below the laminate in the region of clamping with the axle saddle, and the cover layers 15 outside the region of clamping with the axle saddle.

The bearing laminate 9 and the cover layers 15 have the same construction as in the embodiment of FIG. 1. However, the protective layers 14 are partially milled off, and the cover layers 15 in the region inside the briden, or connecting element, are removed and not filled with the fiber-reinforced material, and therefore are respectively thinner.

The embodiment of the double leaf spring 10 is used for providing a central supporting plate 13 in addition to the supporting plate 6 and the supporting plate 7. The supporting plate 13 is located between the main spring leaf 11 and the additional spring leaf 12, and can be composed for example of metal or fiber-reinforced duroplastic synthetic material. In the region outside the connecting elements, the spring leaves 11 and 12 are connected with the central supporting plate 13 via pressure cushions 8 of rubber-elastic material. The pressure cushions 8 can be pretensioned. The supporting plates 6, 7 and 13 are provided outside the connecting elements with recesses for accommodating the pressure cushions 8.

In the second embodiment, the upper supporting plate 7 is convexly shaped in the region between the connecting elements and at its upper side 7a which abuts against the clamping plate. In other words, it has a slight curvature towards the clamping plate.

The invention is not limited to the details shown since various modifications and structural changes are possible without departing in any way from the spirit of the present invention.

What is desired to be protected by Letters Patent is set forth in particular in the appended claims.

1. A leaf spring to be clamped between a saddle of a vehicle axis and a clamping plate by means of at least two connecting elements spaced from one another in a longitudinal direction, said saddle and said clamping plate having respective predetermined lengths;
the leaf spring comprising in combination,
an elongated spring member composed of a fiber-reinforced duroplastic synthetic material;
at least two supporitng plates, each having a length exceeding the length of the saddle and of the clamping plate, and each having an inner region located between the connecting elements, and an outer region located outside the connecting elements, one of said supporting plates being located at one said of said spring member, so as to be arranged between said spring member and said saddle, the other of said supporitng plates being located at the other side of said spring member, so as to be located between said spring member and said clamping plate, said supporting plates abutting against said spring member in said inner region; and
at least two pressure cushions composed of a rubber-elastic material, each being located between a respective one of said supporitng plates and said spring member and only in said outer region outside the connecting elements.

2. A leaf spring as defined in claim 1, and further comprising an additional elongated spring member composed of a fiber-reinforced duroplastic synthetic material, an additional supporting plate located between said spring member and said additional spring member, and having a length exceeding the length of said saddle and of said clamping plate, and additional pressure cushions composed of a rubber-elastic material and located between said additional supporting plate and each of said spring members and only in said outer region outside the connecting elements.

3. A leaf spring as defined in claim 2, wherein said first-mentioned additional supporting plate is composed of metal.

4. A leaf spring as defined in claim 2, wherein said one, said other and said additional supporting plates are composed of the fiber-reinforced duroplastic synthetic material.

5. A leaf spring as defined in claim 2, wherein said one, said other and said additional supporting plates are firmly and adhesively connected with said first mentioned and said additional spring members in said inner region.

6. A leaf spring as defined in claim 2, wherein said one, said other and said additional supporting plates are firmly and adhesively connected with said pressure cushions in said outside region.

7. A leaf spring as defined in claim 2, wherein said spring members have outer surfaces, said pressure cushions having sides facing said spring members, and being firmly and adhesively connected at said sides with said outer surfaces of said spring members.

8. A leaf spring as defined in claim 2, wherein the spring members have outer surfaces, said pressure cushions being arranged between said one, said additional and other supporting plates, and said outer surfaces of said spring members, and being pre-tensioned.

9. A leaf spring as defined in claim 2, wherein said spring members composed of a fiber-reinforced duroplastic synthetic material are each formed as a bearing laminate arranged to absorb static and dynamic spring forces and moments.

10. A leaf spring as defined in claim 9, wherein each of said laminates has two sides; and further comprising non-bearing protective layers each arranged at the respective one of said sides of the respective one of said bearing laminates, and being composed of a duroplastic synthetic plastic material.

11. A leaf spring as defined in claim 2, wherein each of said spring members composed of a fiber-reinforced duroplastic synthetic plastic material has two sides; and further comprising non-bearing cover layers each arranged at a respective one of said sides of a respective one of said spring members in said outer region.

12. A leaf spring as defined in claim 1, wherein said other supporting plate has a surface which is arranged to face the clamping plate and being formed convexly inside said inner region.

13. A leaf spring as defined claim 1, wherein said one and said other supporting plates are composed of metal.

14. A leaf spring as defined in claim 1, wherein said one and said other supporting plates are composed of the fiber-reinforced duroplastic synthetic material.

15. A leaf spring as defined in claim 1, wherein said one and said other supporting plates are firmly and adhesively connected to said spring member in said inner region.

16. A leaf spring as defined in claim 1, wherein said one and said other supporting plates are firmly and adhesively connected with said pressure cushions in said outer region.

17. A leaf spring as defined in claim 1, wherein said spring member has outer surfaces, said pressure cushions having sides which face said spring member, and being firmly and adhesively connected at said sides with said outer surfaces of said spring member.

18. A leaf spring as defined in claim 1, wherein said spring member has outer surfaces, said pressure cushions being arranged between said one and other supporting plates, and said outer surfaces of said spring member and being pre-tensioned.

19. A leaf spring as defined in claim 1, wherein said spring member composed of a fiber-reinforced duroplastic synthetic material is formed as a bearing laminate arranged to absorb static and dynamic spring forces and moments.

20. A leaf spring as defined in claim 19, wherein said bearing laminate has two sides; and further comprising two non-bearing protective layers, each being arranged at the respective one of said sides of said bearing laminate in said inner region and also being composed of the fiber-reinforced duroplastic synthetic material.

21. A leaf spring as defined in claim 1, wherein said spring member composed of a fiber-reinforced duroplastic synthetic plastic material has two sides; and further comprising two non-bearing cover layers each arranged at the respective one of said surfaces of said spring member in said outer region, and being composed of a soft thermoplastic synthetic plastic material.

22. A method of manufacturing a leaf spring to be clamped between a saddle of a vehicle axle and a clamping plate by means of connecting elements spaced from one another in a longitudinal direction, the method comprising the steps of
providing at least one elongated spring member extending in the longitudinal direction and being composed of a fiber-reinforced duroplastic synthetic plastic material and having two sides;
covering each of said sides of said spring member with a fiber-reinforced duroplastic protective layer;
covering each of said sides of said spring member with a thermoplastic cover layer;
removing the cover layers in the region between the connecting elements completely;
removing the protective layers in the region between the connecting elements partially;
providing two supporting plates;
connecting each of said supporting plates with pressure cushions of a rubber-elastic material; and
connecting the supporting plates together with said pressure cushions, and with said sides of said spring member so that said pressure cushions are located between the spring member and the supporting plates.

23. A method as defined in claim 22, wherein said steps of removing said thermoplastic cover layers completely and said fiber-reinforced duroplastic protective layers partially include the step of removing layers by milling.

24. A method as defined in claim 22, wherein said step of connecting said pressure cushions with said supporting plates includes vulcanizing said pressure cushions to said supporting plates.

25. A method as defined in claim 22, wherein said step of connecting said pressure cushions with said supporting plates includes glueing said pressure cushions to said supporting plates.

26. A method as defined in claim 22; further comprising the step of reinforcing said cover layers and sid protective layers by glueing a fiber composite material thereto.

27. A method of manufacturing a leaf spring to be clamped between a saddle of a vehicle axle and a clamping plate by means of connecting elements spaced from one another in a longitudinal direction, the method comprising the steps of
providing at least two elongated spring members extending in the longitudinal direction, and each being composed of fiber-reinforced duroplastic synthetic material and having two sides;
covering each of said sides of said two spring members with a fiber-reinforced duroplastic protective layers;
covering each of said sides of said two spring members with a thermoplastic cover layer;
removing the cover layers in the region between the connecting elements completely;
removing the protective layers in the region between the connecting elements partially;
providing two supporting plates;
connecting each of said supporting plates with pressure cushions of a rubber-elastic material; and
connecting the supporting plates together with said pressure cushions with said sides of said two spring members, so that said pressure cushions are located between said spring members and said supporting plates.

* * * * *